United States Patent
Ahiska

(10) Patent No.: US 8,243,135 B2
(45) Date of Patent: Aug. 14, 2012

(54) MULTIPLE-VIEW PROCESSING IN WIDE-ANGLE VIDEO CAMERA

(75) Inventor: Yavuz Ahiska, Esher (GB)

(73) Assignee: Grandeye, Ltd. (GB)

( * ) Notice: Subject to any disclaimer, the term of this patent is extended or adjusted under 35 U.S.C. 154(b) by 182 days.

(21) Appl. No.: 12/263,875

(22) Filed: Nov. 3, 2008

(65) Prior Publication Data

US 2009/0102950 A1   Apr. 23, 2009

Related U.S. Application Data

(63) Continuation of application No. 10/837,325, filed on Apr. 30, 2004, now Pat. No. 7,450,165.

(60) Provisional application No. 60/467,588, filed on May 2, 2003.

(51) Int. Cl.
H04N 7/18 (2006.01)
H04N 5/262 (2006.01)

(52) U.S. Cl. .................... 348/143; 348/240.2

(58) Field of Classification Search .......... 348/240, 348/143, 169
See application file for complete search history.

(56) References Cited

U.S. PATENT DOCUMENTS

| | | | |
|---|---|---|---|
| 4,728,839 A | 3/1988 | Coughlan | |
| 5,185,667 A | 2/1993 | Zimmermann | |
| 5,359,363 A * | 10/1994 | Kuban et al. | 348/36 |
| 5,912,980 A * | 6/1999 | Hunke | 382/103 |
| 6,097,430 A * | 8/2000 | Komiya et al. | 348/218.1 |
| 6,211,911 B1 * | 4/2001 | Komiya et al. | 348/218.1 |
| 6,731,805 B2 * | 5/2004 | Brodsky et al. | 382/199 |
| 7,025,275 B2 * | 4/2006 | Huang et al. | 235/486 |
| 7,058,237 B2 * | 6/2006 | Liu et al. | 382/276 |
| 7,148,914 B2 * | 12/2006 | Bronson | 348/207.1 |
| 7,161,616 B1 * | 1/2007 | Okamoto et al. | 348/148 |
| 7,173,650 B2 * | 2/2007 | Cohen-Solal et al. | 348/172 |
| 7,295,228 B2 * | 11/2007 | Roberts et al. | 348/143 |
| 7,307,655 B1 * | 12/2007 | Okamoto et al. | 348/222.1 |
| 7,352,915 B2 * | 4/2008 | Nose et al. | 382/275 |
| 7,477,205 B1 * | 1/2009 | de Waal et al. | 345/1.3 |
| 7,528,881 B2 | 5/2009 | Ahiska | |
| 7,529,424 B2 | 5/2009 | Ahiska | |
| 2005/0007453 A1 | 1/2005 | Ahiska | |

* cited by examiner

*Primary Examiner* — Lin Ye
*Assistant Examiner* — Amy Hsu
(74) *Attorney, Agent, or Firm* — Robert O. Groover, III; Seth A. Horwitz

(57) ABSTRACT

A motion video camera that removes the need for mechanical pan, tilt, and zoom apparatus is disclosed. The video camera includes the following. A wide-angle optical system is configured to receive an optical image. An image sensor is coupled to the optical system and is configured to convert the optical image to an electronic image. An image processing circuit is coupled to the image sensor and is configured to receive the electronic image and to execute movement and zoom operations by correcting distortions in the electronic image introduced by the wide-angle optical system and image sensor.

20 Claims, 6 Drawing Sheets

MULTIPLE-VIEW PROCESSING IN WIDE-ANGLE VIDEO CAMERA

RELATED APPLICATIONS

This application is a continuation of application Ser. No. 10/837,325 filed Apr. 30, 2004 now U.S. Pat. No. 7,450,165 which claims priority from U.S. Provisional Patent Application No. 60/467,588 filed May 2, 2003, entitled "Multiple View Processing in Wide-Angle Video Camera".

The present innovations are related to the following copending U.S. patent applications:

U.S. patent application, Ser. No. 10/837,012, entitled "Correction of Optical Distortion by Image Processing", filed on Apr. 30, 2004 and assigned to the assignee of the present invention.

U.S. patent application, Ser. No. 10/837,326, entitled "Multiple Object Processing in Wide-Angle Video Camera", filed Apr. 30, 2004 and assigned to the assignee of the present invention.

U.S. patent application, Ser. No. 10/837,019, entitled "Method and System of Simultaneously Displaying Multiple Views for Video Surveillance", filed on Apr. 30, 2004 and assigned to the assignee of the present invention.

FIELD OF THE INVENTION

The present invention relates generally to video cameras and specifically to the control of a video camera which can perform pan tilt and zoom functions without a mechanical part.

BACKGROUND OF THE INVENTION

In situations where a camera is physically separated from the user it is useful to provide a means to change its viewing direction and magnification. A camera that provides this is commonly referred to as a pan, tilt, and zoom camera, often abbreviated to PTZ. Control of a PTZ camera comes from a base station.

Current PTZ cameras rely on a mechanical apparatus to control the movement of the camera and its lens. This apparatus is heavy, expensive, prone to failure, and slow to respond.

The design of a mechanical PTZ camera can be found in U.S. Pat. No. 4,728,839 issued to J. B. Coughlan, et al, on Mar. 1, 1988. FIG. 1 shows the typical arrangement of a mechanical PTZ system. Video camera 15 may be a mechanical PTZ camera with zoom lens 1 connected to image sensor 2.

Image sensor 2 receives light through zoom lens 1 and sends a signal to image capture circuit 3, which captures an image or stream of images, for example, a real-time video feed, representing the light impinging on image sensor 2. Output circuit 5 transmits the captured image. Motors 4, including those for pan, tilt and zoom operations, may be integral or separate from video camera 15. Motors 4 are operated by signals from control circuit 6.

Base station 20 has receiving circuit 8 that receives the captured image from output circuit 5. The captured image is transmitted to both display circuit 9 and record circuit circuit 10. Display circuit 9 provides a view of the captured image, while record circuit 10 records the captured image(s). Control circuit 7 may receive input from a user directing video camera 15 to pan, tilt, or zoom. Control circuit 7 provides the appropriate inputs to control circuit 6.

It is common practice for surveillance cameras to signal an alarm on the basis of movement within the field of view. This commonly performed by comparison of the current video frame against a previous frame; if a region of the frame has changed sufficiently it is considered to be a moving object. Mechanical PTZ cameras suffer from the disadvantage that when zoomed in on a particular area they are unable to view other areas and so may miss important events.

Accordingly, what is needed is a system and method for zooming in on one particular area without loosing the ability to maintain security or a view of other areas.

SUMMARY OF THE INVENTION

A motion video camera that removes the need for mechanical pan, tilt, and zoom apparatus is disclosed. The video camera includes the following. A wide-angle optical system is configured to receive an optical image. An image sensor is coupled to the wide-angle optical system and is configured to convert the optical image to an electronic image. An image processing circuit is coupled to the image sensor and is configured to receive the electronic image and to execute movement and zoom operations by correcting distortions in the electronic image introduced by the lens and image sensor. The video camera further provides a wide-angle view with simultaneous tilt, pan and zoom operations and provides for event detection in one area while zooming or panning at another area.

BRIEF DESCRIPTION OF THE DRAWING(S)

DETAILED DESCRIPTION OF THE INVENTION

Figure 1:
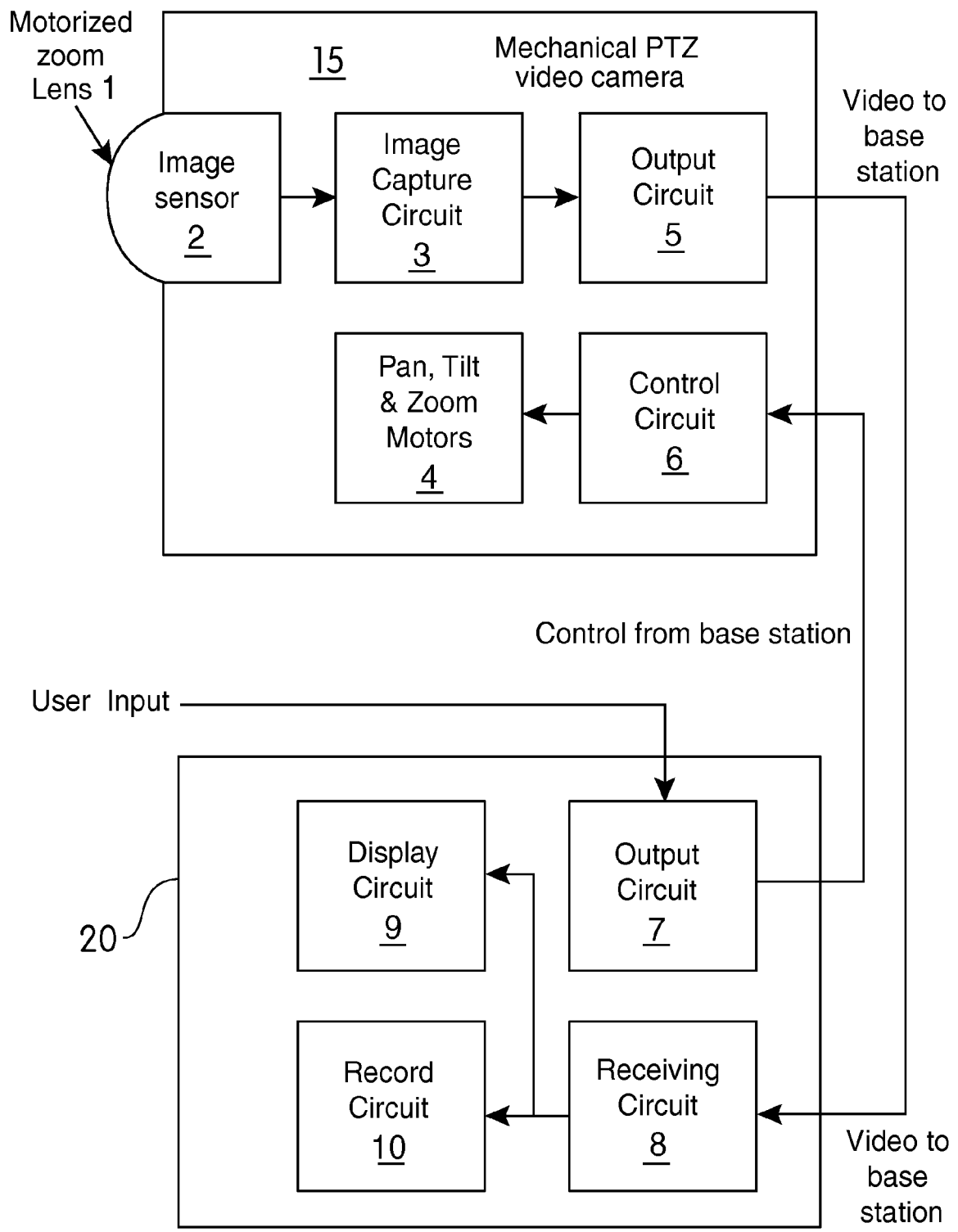
FIG. 1 is a prior art block diagram illustrating a video camera and base station system.

The present invention relates generally to video cameras and specifically to the control of a video camera for the purpose of surveillance or inspection. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

One example of a lens is a fisheye lens. Fisheye lenses have traditionally been used to capture environments. This type of lens was first developed to allow astronomers to capture the entire hemisphere of the night sky with one photograph. All lenses have some amount of distortion but it is greatest in those of shorter focal length and wider field of view. Algorithms for correcting this distortion have been around for some time and there are published algorithms on the correction of image distortion resulting from a wide angle fish-eye lens including a technique known as environment mapping.

Telerobotics International, Inc., in 1991 developed and patented the Omniview Motionless Camera System, U.S. Pat. No. 5,185,667, in which a video camera with a fish-eye lens was used in conjunction with special purpose image processing hardware to project a spherical image onto a plane in perspective. The technology described makes use of live video and specialized rendering hardware to generate perspective views of a dynamic scene in real-time.

In 1993, Telerobotics specialized this projection system to allow remote surveillance through the use of a fish-eye lens in U.S. Pat. No. 5,359,363, Omniview Motionless Camera Surveillance System. In this invention the fish-eye lens used allowed the monitoring of the entire hemisphere without mechanical parts, which were replaced by optics and electronics to provide pan-and-tilt orientation, rotation, and magnification within a selected field-of-view. The imaging device of this system is based on the principle that the distorted image from a fish-eye lens can be mathematically corrected using high-speed electronic circuitry. Specifically, it provides for a system that takes a distorted image from a camera, corrects the distortion, and provides for viewing of the corrected image.

The invention is an improvement over these devices and offers many advantages. First, the invention provides a complete replacement for a mechanical PTZ camera whereas the current art requires the system of camera and base station to be replaced. Second, the method used to correct wide-angle lens distortion is able to cope with multiple types of distortion and is not restricted to a spherical projection; this provides better image quality from a lower cost lens. Third, the invention provides the capacity for additional image processing which provides features beyond anything disclosed to date. The invention may be of use in many fields including closed circuit television networks, and robotic vision.

Figure 2:
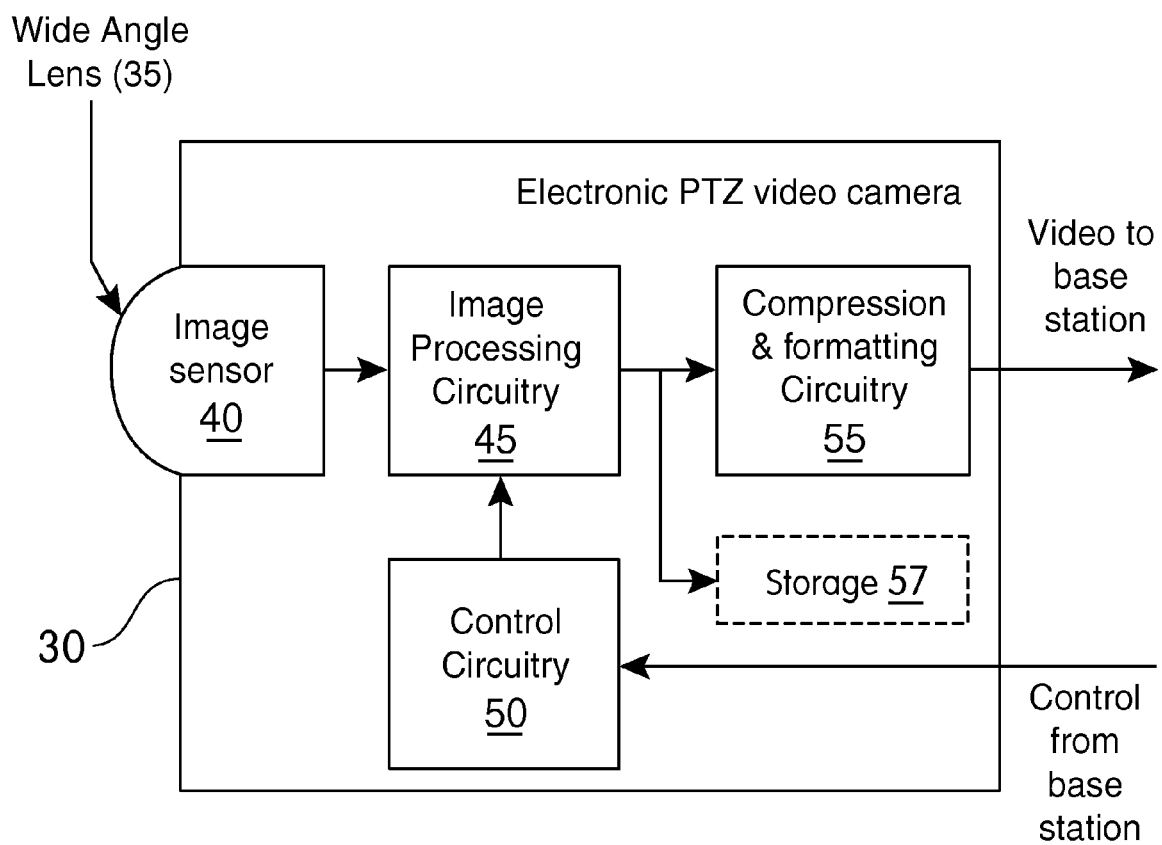
FIG. 2 is a block diagram illustrating one embodiment of the invention.

FIG. 2 is a block diagram illustrating one embodiment of the invention. Video camera 30 includes wide-angle optical lens 35, in one embodiment a fisheye lens. Image sensor 40 is connected to lens 35, image processing circuit 45, control circuit 50, and output circuit 55, which in one embodiment is a compression and formatting circuit. In normal operation lens 35 projects a wide-angle view of a scene under observation onto image sensor 40. Image sensor 40 is typically a CCD or CMOS device, which converts the light falling upon it into electrical signals that the supporting circuitry converts to a form suitable for use by image processing circuit 45. This conversion typically includes conversion from an analog signal to a digital signal of an appropriate format.

The output of image sensor 40 is a digital representation of the image projected by lens 35. The wide-angle nature of lens 35 causes this image to be distorted to such a degree that recognition of the scene will be poor. In general the nature of the distortion will depend upon the shape of lens 35 and its position relative to image sensor 40. Variation in manufacturing tolerances may cause the distortion to differ between individual examples of the video camera. Output circuit 55 may provide output to a base station (not shown), while control circuit 50 may receive input from a base station (not shown).

One purpose of image processing circuit 45 is to correct the distortion introduced by the lens-sensor combination. One method of achieving this is disclosed by co-pending patent application "Correction of Optical Distortion by Image Processing," U.S. patent application Ser. No. 10/837,012, which discloses the use of mapping tables to correct the distortion and is incorporated by reference herein. The tables may be used to remove many forms of geometric distortion and are not limited to spherical distortion. The image processing circuit may also filter, color correct, adjust the white balance, or apply other routine processing operations expected of a camera on the distorted or the corrected image to improve its appearance. Some of these functions could be executed in a application specific processors which may be a part of the image processing circuit. In addition to correcting optical distortion the image processing circuit may be used to watermark the transmitted video to protect against tampering. Other methods of correcting distortion are well known by those skilled in the art.

Figure 3:
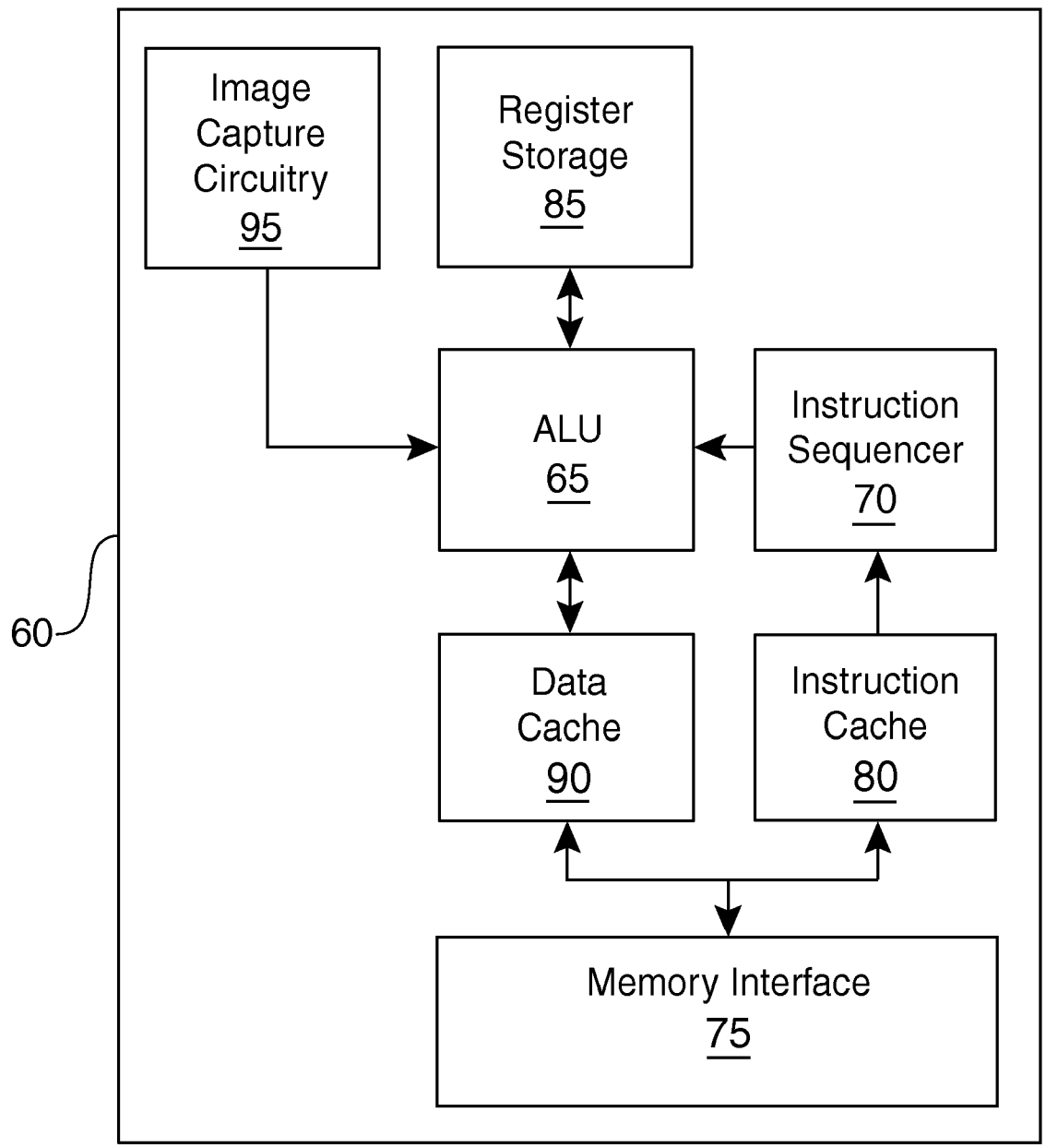
FIG. 3 is a block diagram illustrating one embodiment of the image processing circuit of FIG. 2

FIG. 3 is a block diagram illustrating one embodiment of the image processing circuit of FIG. 2. In one embodiment image processing circuit 45 is represented by digital signal processor (DSP) 60, as shown in FIG. 3. In this arrangement arithmetic and logic unit (ALU) 65 is controlled by instruction sequencer 70 that in turn fetches instructions from memory 75 via instruction cache 80. The instructions executed by instruction sequencer 70 may cause ALU 65 to operate upon data held in register storage 85 or memory 75 accessed via data cache 90, or the output of image capture circuitry 95. DSP 60 may be used to execute other algorithms upon the image including, but not limited to, sharpening, contrast adjustment, color adjustment, resizing, or analysis algorithms such as motion detection, smoke detection, or abandoned package detection. The algorithms to may be held in volatile or non-volatile memory within the camera and may be loaded at the time of manufacture, or as an upgrade procedure in the field, or downloaded to the camera during normal operation.

Figure 4:
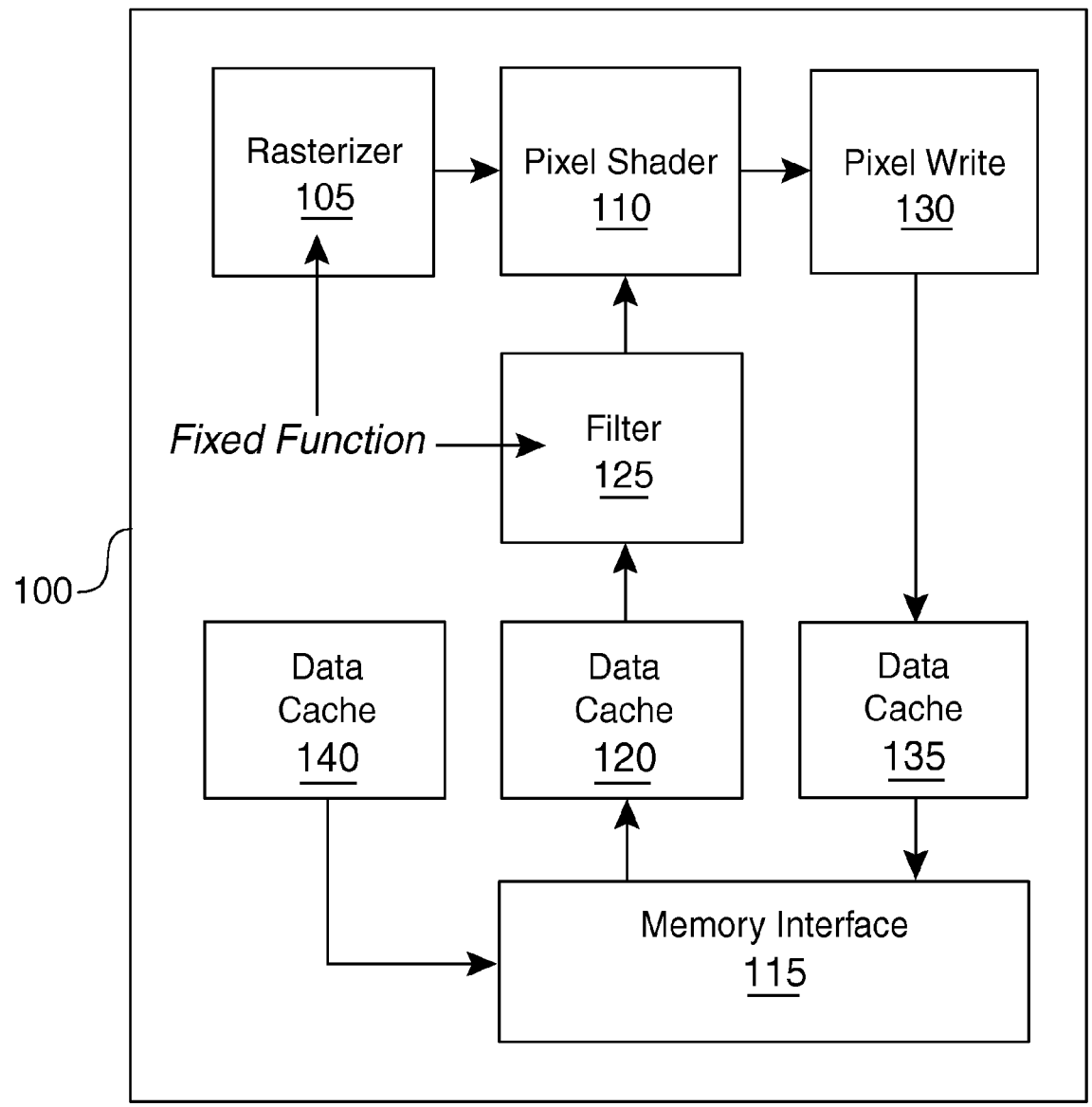
FIG. 4 is a block diagram illustrating another embodiment the image processing circuit of FIG. 2

FIG. 4 is a block diagram illustrating another embodiment of the image processing circuit of FIG. 2. It should however be clear to those skilled in the art that the algorithms mentioned here may be implemented with a combination of fixed-function and programmable hardware, illustrated in FIG. 4. In this alternative embodiment the image processing circuitry is implemented by programmable graphics processor 100 in which rasterizer 105 produces the coordinates of the output image and passes them to pixel shader 110 which calculates the pixels in the source image to be used, causes them to be read from memory 115 via data cache 120, and filtered by filter 125. The resulting pixels are transferred to pixel write unit 130, which writes them to memory 115 via data cache 135. In this embodiment data from image capture circuit 140 is fed directly to memory 115, which is used hold the resulting pixel data.

In another embodiment the image processing circuit may be a combination of a digital signal processor and a graphics processor while the control circuit is implemented with a commonly available central processing unit such as that found in personal computers. Those skilled in the art will recognise that these examples are indicative of possible implementations with being exhaustive.

Referring again to FIG. 2, image processing circuit 45 is under control of control circuit 50 that receives commands from the base station (not shown). These commands might typically include directions to pan, tilt, or zoom the view transmitted by camera 30, or it may indicate other actions such as the enabling of other algorithms including motion detection. In one embodiment the control circuit may be implemented as part of the image processor.

Image sensor 40 should be of sufficiently high resolution such that a section of the captured view may be extracted and transmitted to the base station. Changing the extracted section, referred to as the region-of-interest, results in changes in the view presented to the base station. Moving the region-ofinterest has the effect of panning; making the region-of-interest smaller gives the effect of increasing magnification, increasing the size of the region-of-interest has the effect of reducing magnification. The size of the image sensor determines the maximum magnification according to:

max horizontal magnification=horizontal resolution of sensor/horizontal resolution of transmitted view max vertical magnification=vertical resolution of sensor/vertical resolution of transmitted view Hence an image sensor with a high resolution results in a larger maximum magnification. A standard video format might have a resolution of approximately 400,000 pixel therefore if a 2,000,000 pixel sensor is used then there is an effective zoom of five times.

In situations where it is too costly to use a single, high-resolution sensor it is possible to construct a high-resolution sensor from several low-resolution sensors. In this embodiment the sensors are arranged such that one or several lenses focus the view upon them; the errors that occur where the sensors join are corrected by the same techniques as wide-angle distortion.

Output circuit 55 is optionally used to compress and format the output of image processing circuit 45. Compression is used to reduce the bandwidth needed to transmit the view to the base station. This is important, as the transmission medium is typically restricted in the bandwidth available. The compression may be a standard format such as MPEG4 or a proprietary format understood by the base station. Other methods of compression include reducing the frame rate or resolution of the video, wavelet or discrete cosine transform (DCT).

Output circuit 55 is also responsible for formatting the video in a way suitable for reception by the base station. This might involve converting it to an analog signal such as RS172 or maintaining it in a digital form and converting it to a network format such as Internet Protocol packets. In another embodiment compression and formatting may be performed by image processing circuit 45. In one embodiment output circuitry may provide a plurality of analog signals, such as PAL or NTSC, with different views of regions of interest. More than one output allows different views from the same camera to be displayed at a standard base station for better surveillance.

In order to implement the pan, tilt, and zoom commands from control circuit 50, image processing circuit 45 extracts the portion of the wide-angle image that is to be transmitted to the base station. The region-of-interest may be the complete frame, or a portion of the frame. In either case it is likely that the resolution of the extracted region (i.e. the number of pixels it contains) will not match the resolution expected by the base station so image processing circuit 45 scales the region either up or down in resolution. This scaling may also be done as part of the image correction step mentioned earlier. In surveillance systems it is normal to zoom the camera on regions where suspicious activity is noted. When zoomed in, a mechanical PTZ camera loses sight of other parts of the image. In contrast, the invention maintains visibility of the full scene available from lens 35 and this may be transmitted to the base station in addition to the zoomed region of interest. The full scene may be embedded within the zoomed image as a thumbnail or small image enabling the operator to monitor other areas while inspecting suspicious activity. A motion video camera incorporating the ability to transmit a thumbnail embedded within a larger frame is disclosed in co-pending patent application "Correction of Optical Distortion by Image Processing," U.S. patent application Ser. No. 10/837,012, and incorporated by reference herein.

The number of regions-of-interest that can be simultaneously monitored is limited only by the processing power in the camera and the bandwidth constraints of the link to the base station. Transmission of additional regions-of-interest need not be in the form of thumbnails and may instead be as interleaved fields or frames, or multiplexed in some other way dependent upon the nature of the link with the base station. Co-pending patent application "Multiple Object Processing in a Wide-Angle Video Camera," U.S. patent application Ser. No. 10/837,326, and incorporated by reference herein, discloses a motion camera capable of capturing multiple views in which each view is transmitted to the base station as though from a distinct Internet Protocol camera.

A standard video format might have a resolution of approximately 400,000 pixels, therefore if a 2,000,000 pixel sensor is used then there is an effective zoom of five times.

The continuous capture of a wide-angle view avoids temporary blind-spots experienced by mechanical PTZ cameras when they zoom in on a specific area, which avoids missing movements that should cause an event alarm to be signalled. In one embodiment, storage 57 receives input from image processing circuit. Storage 57, for example a magnetic storage medium such as a disk drive, is added to the camera for the purpose of storing the previously captured wide-angle video, either compressed or uncompressed. This stored video may be transmitted to the base station when an event has been detected to provide context for the signalled event, the relevant views being extracted from the stored video in the same manner as from live video. Hence event detection is more reliable in this disclosed invention than in prior art.

Figure 5:
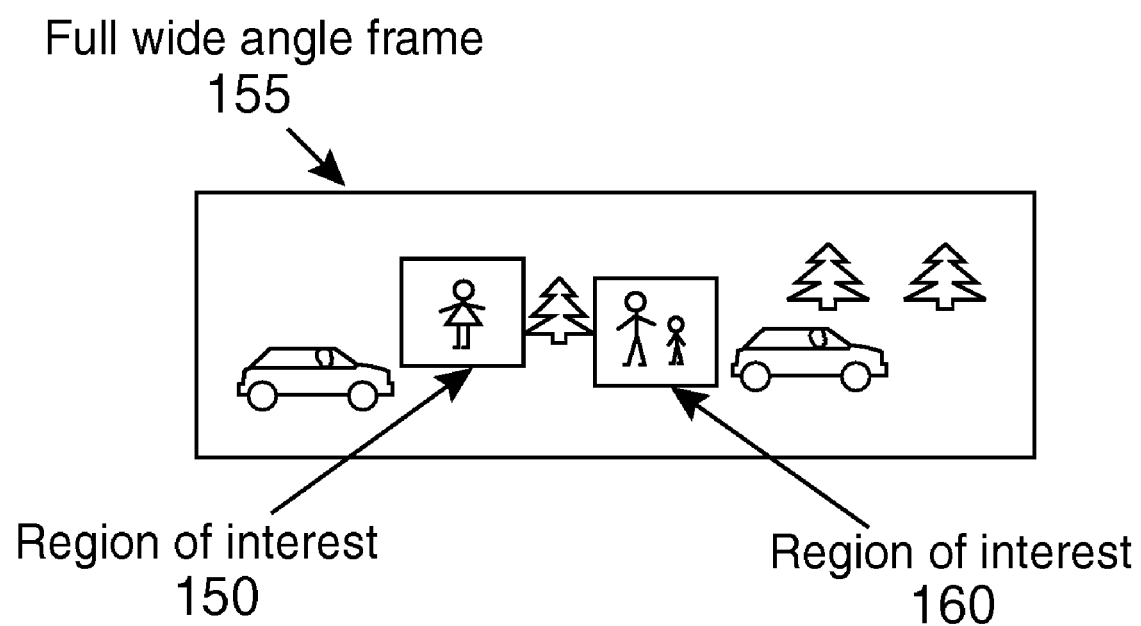
FIG. 5 is a picture illustrating the extraction of two regions of interest from a wide-angle view.

FIG. 5 is a picture illustrating the extraction of two regions of interest from a wide-angle view. FIG. 5 illustrates the extraction of first region-of-interest 150 from wide-angle view 155; it also shows the extraction of second region-of-interest 160. As the view transmitted to the base station is determined by the region extracted from the wide-angle image, the direction of view may be changed at high speed, limited only by the frame rate of the video. This is a major benefit over a mechanical PTZ camera, which may take several seconds to change its viewing direction.

Figure 6:
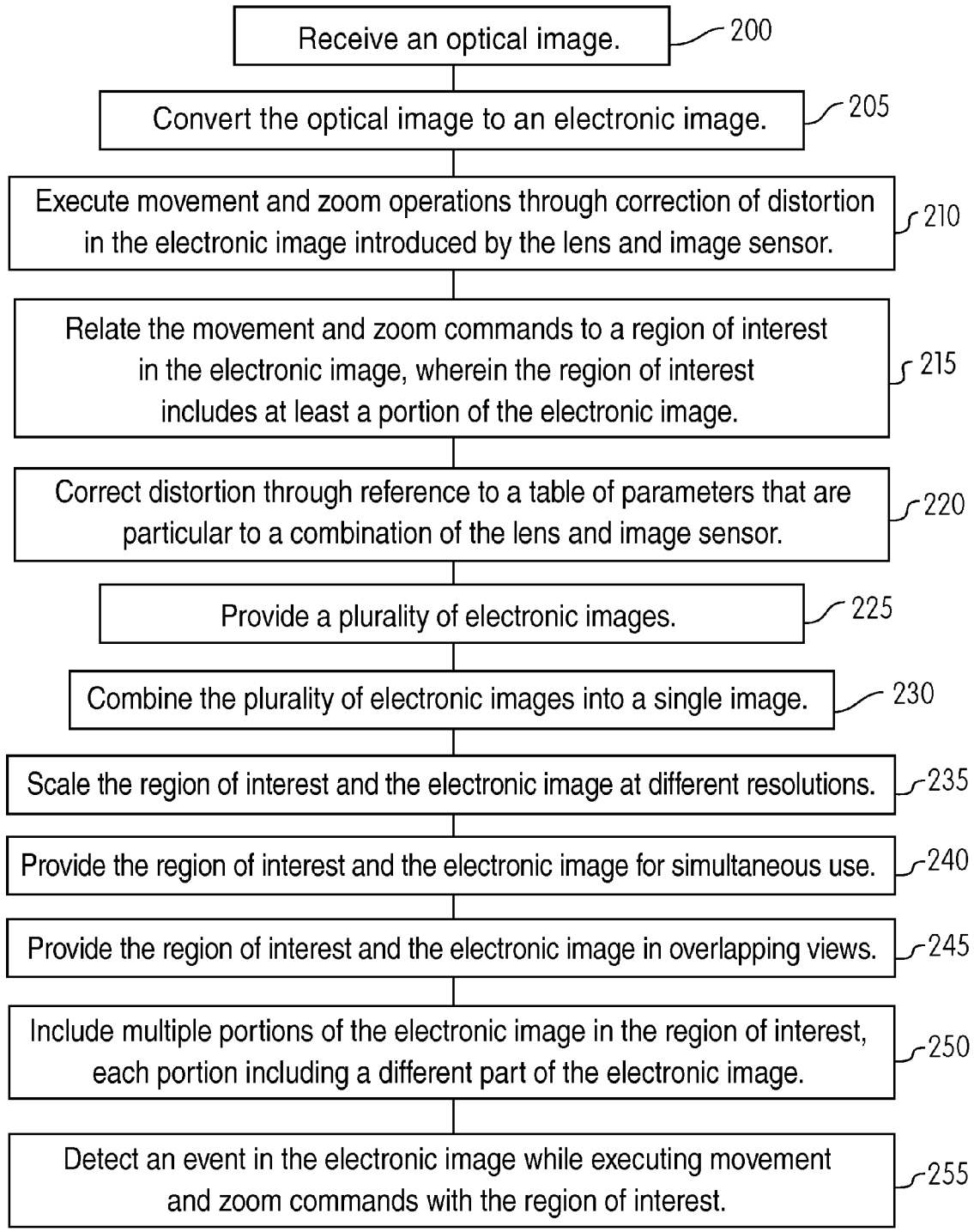
FIG. 6 is a flow chart illustrating a method of operating a video camera.

FIG. 6 is a flow chart illustrating a method of operating a video camera. The video camera includes a lens, an image sensor coupled to the lens, and an image processing circuit coupled to the image sensor. In block 200, receive an optical image. In block 205, convert the optical image to an electrical image. In block 210, execute movement and zoom operations through correction of distortion in the electronic image introduced by the lens and image sensor. In block 215, relate the movement and zoom commands to a region of interest in the electronic image, wherein the region of interest includes at least a portion of the electronic image. In block 220, correct distortion through reference to a table of parameters that are particular to a combination of the lens and image sensor. In block 225, provide a plurality of electronic images. In block 230, combine the plurality of electronic images into a single image. In block 235, scale the region of interest and the electronic image at different resolutions. In block 240, provide the region of interest and the electronic image for simultaneous use. In block 245, provide the region of interest and the electronic image in overlapping views. In block 250, include multiple portions of the electronic image in the region of interest, each portion including a different part of the electronic image. In block 255, detect an event in the electronic image while executing movement and zoom commands with the region of interest.

In one embodiment output circuitry may provide a plurality of analog signals, such as PAL or NTSC, with different views of regions of interest. More than one output allows different views from the same camera to be displayed at a standard base station for better surveillance.

The foregoing has described methods for the implementation of a multiple view video camera that are given for illustration and not for limitation. Although the invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A video processing system comprising:
   a wide-angle optical system configured to receive an optical image;
   a high-resolution image sensor coupled to the optical system and configured to convert the optical image to an electronic image;
   an image processing circuit coupled to the image sensor and configured to receive and process the electronic image, one of its tasks being to correct optical distortion on one or more regions of interest of the electronic image through reference to a table of parameters specific to a combination of the optical system and the image sensor, each of said regions of interest including at least a portion of said electronic image from anywhere within said electronic image, said image processing circuit configured to perform event detection in at least one other area of the electronic image;
   a control circuit coupled to said image processing circuit and configured to receive movement and zoom commands to transmit a signal to said image processing circuit relating the movement and zoom commands specific to at least one region of interest in said electronic image, while said image sensor also performs said event detection; and
   an output circuit coupled to said image processing circuit capable of outputting in a plurality of electronic signal formats.

2. The video processing system of claim 1, wherein the output circuit comprises a compression and formatting circuit.

3. The video processing system of claim 1, wherein the output circuit outputs an electronic video signal to a coupled base station, and the base station provides command inputs to the control circuit.

4. The video processing system of claim 1, wherein said image processing circuit can perform one or more of: distortion correction; filtering; color correction; or white balance adjustment.

5. The video processing system of claim 1, wherein the image processing circuit comprises: a digital signal processor, comprising an arithmetic and logic unit controlled by a coupled instruction sequencer, which fetches instructions from a memory; at least one of a coupled register storage or memory storing image data for processing; and accessed algorithms for processing an image comprising a least one of sharpening, contrast adjustment, color adjustment, resizing, or analysis.

6. The video processing system of claim 1, wherein the image processing circuit comprises: a programmable graphics processor, comprising a rasterizer producing coordinates of an output image transmitted to a coupled pixel shader calculating the pixels in the source image to use, causes the pixels to be read from a coupled memory, and filtered by a coupled filter; and accessed algorithms for processing an image comprising at least one of sharpening, contrast adjustment, color adjustment, resizing, or analysis.

7. The video processing system of claim 1, wherein the image processing circuit comprises a combination of a digital processing circuit and a graphics processor.

8. The video processing system of claim 1, wherein at least one region of interest is simultaneously monitored while maintaining visibility of the full electronic image.

9. A video processing system comprising:
   at least one image sensor coupled to an optical system that captures a distorted image, said image sensor converting the optical image into an electronic image;
   an image processing circuit coupled to the at least one image sensor, said image processing circuit receiving and processing the electronic image to correct the distorted image on one or more regions of interest from anywhere in said electronic image based on factors specific to the optical system and at least one image sensor, the image processing circuit also producing at least one zoomed electronic image of at least one region of interest anywhere in the image based on execution of movement and zoom commands specific to said region of interest anywhere within the image while maintaining visibility of the full electronic image, the said image processing circuit also performing event detection in at least one other area of the electronic image while producing the zoomed image;
   a control circuit coupled to said image processing circuit; and
   an output circuit coupled to the image processing circuit.

10. The video processing system of claim 9, wherein the control circuit receives movement and zoom commands to transmit to the image processing circuit executing the movement and zoom commands, wherein the region of interest comprises at least a portion of the electronic image.

11. The video processing system of claim 10, wherein the image processing circuit scales the region of interest up or down.

12. The video processing system of claim 9, wherein a plurality of regions of interest are simultaneously monitored while maintaining visibility of the full electronic image.

13. The video processing system of claim 9, wherein the output circuit is capable of outputting in a plurality of electronic signal formats.

14. A method for operating a video processing system, comprising the steps of:
   receiving a distorted wide-angle optical image converted into an electronic signal of image frames at an image processing circuit;
   processing the image frames to correct wide-angle optical distortion, which includes one or more regions of interest within the image frames, wherein view commands specific to the one or more regions of interest are executed via manipulating the image frame data to produce an electronic image frame for each of the one or more regions of interest anywhere within the full electronic image frame while maintaining visibility of the full electronic image frame; and
   while executing said view commands, also performing event detection in at least one other area of the electronic image; and
   outputting a plurality of electronic image frames to a coupled base station corresponding to each of the one or more regions of interest and the full electronic image.

15. The method of claim 14, wherein the view commands comprise at least one of a movement and a zoom component.

16. The method of claim 14, further comprising the steps of:
formatting the plurality of electronic image frames; and
compressing the plurality of electronic image frames.

17. The method of claim 14, further comprising the step of:
transmitting the one or more regions of interest as thumbnails, interleaved fields or frames, or multiplexed.

18. The method of claim 14, further comprising the step of:
storing image frames in a memory.

19. The method of claim 18, further comprising the steps of:
transmitting stored image frames to a base station upon detection of an event; and
extracting portions of the image frames relative to the event.

20. The method of claim 14, further comprising the steps of:
automatically detecting an event using mathematical analysis of an image frame;
designating a portion of the image frame as a region of interest correlating to the event; and
executing view commands to generate an image frame of the region of interest.

* * * * *